Figures 1, 2, 3:
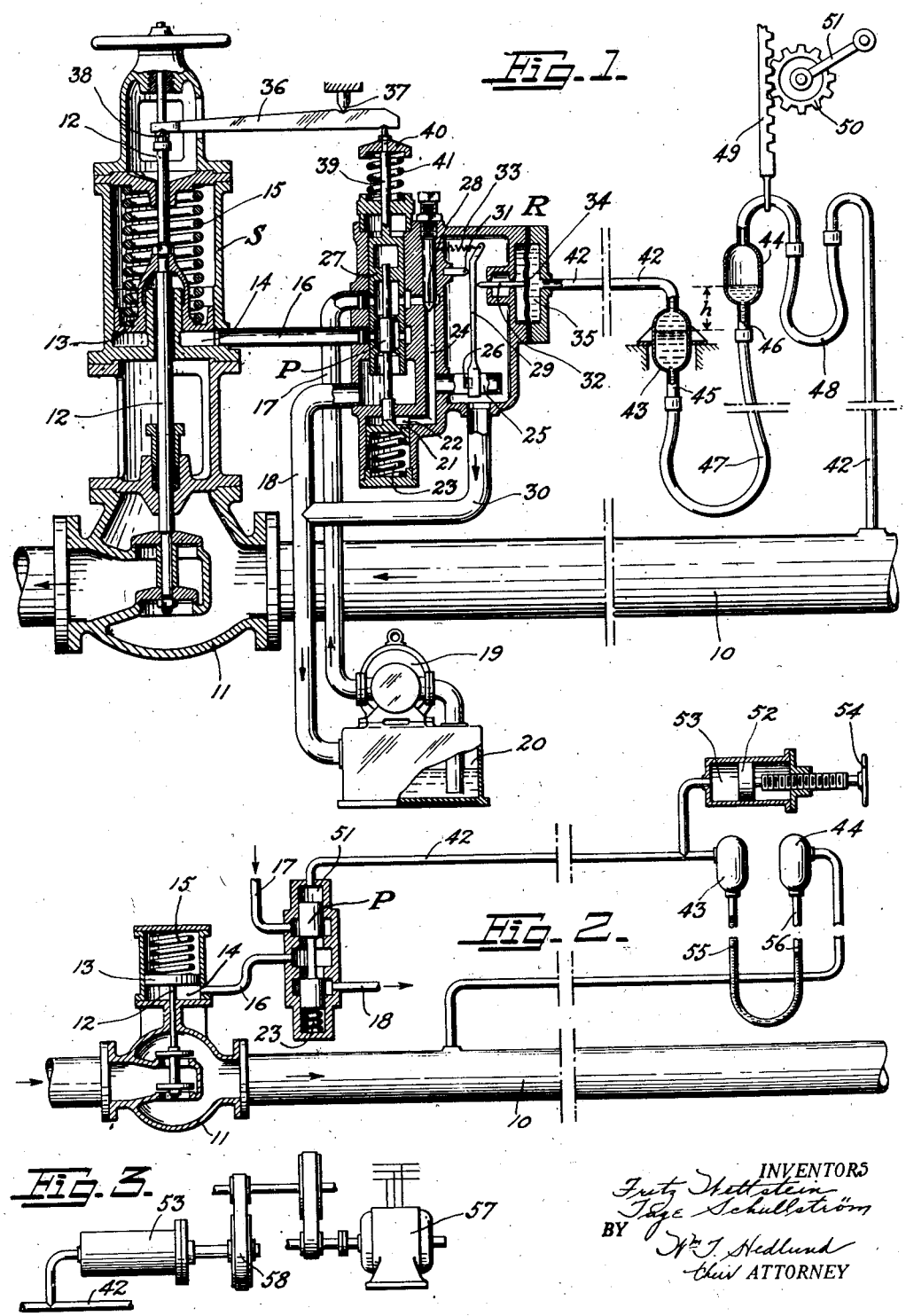

Sept. 3, 1929.  F. WETTSTEIN ET AL  1,726,726

REGULATION

Filed April 17, 1926

INVENTORS
Fritz Wettstein
Tage Schullström
BY
Wm. J. Hedlund
their ATTORNEY

Patented Sept. 3, 1929.

1,726,726

UNITED STATES PATENT OFFICE.

FRITZ WETTSTEIN, OF SUMMIT, NEW JERSEY, AND TAGE SCHULLSTRÖM, OF NEW YORK, N. Y., ASSIGNORS TO RUTHS ACCUMULATOR COMPANY, INCORPORATED, OF NEW YORK, N. Y., A CORPORATION OF DELAWARE.

REGULATION.

Application filed April 17, 1926. Serial No. 102,636.

Our invention relates to automatic regulation and more particularly to the transmission of regulating impulses from the controlling force to that member of the regulating organization which is first affected by the impulses. The regulating impulse is usually a variation of condition, such as pressure, in the medium which is to be regulated, though this is not necessarily so.

One object of our invention is to provide a regulating arrangement wherein adjustment for regulation at different pressures is obtained without rearranging the relative relation of parts of a regulating apparatus and without the removal and replacement of parts.

A further object of our invention is to provide what may be termed a remote control by means of which it is possible to adjust a regulator at a distance from the regulating unit.

A still further object of our invention is to provide means for adjusting a regulator to operate at different ranges of condition of the controlling medium without necessitating the distortion of any parts and permitting the regulating unit to operate in a given normal unchanged manner independently of adjustments to the different ranges.

On the accompanying drawing we have shown two modifications of the invention applied to different forms of fluid pressure operated regulators, in both of which modifications the impulses are taken from a steam line and utilized to govern flow through the same steam line but it is to be understood that our invention is not limited to control of steam nor to control by and of pressure nor to control of fluid pressure operated regulators. Our invention has a broad field of applicability and may be used anywhere where there is a transmission of regulating impulses.

In the accompanying drawing which illustrates preferred embodiments of the invention; Fig. 1 shows the invention in one form applied to an indirect operating liquid pressure operated regulator with continuous flow pre-regulation and with return motion interposed between that part of the regulator known as the servo-motor and that part known as the pilot valve. The form of the invention applied to this type of regulator includes a vertically adjustable mercury column which serves to equalize a difference of pressure between that part of the apparatus which is known as the relay and the steam line. Fig. 2 shows an embodiment wherein a plunger is applied to vary the height of the liquid column and in which a second embodiment of the invention is applied to a simple regulator comprising merely a double-piston pilot valve and a servo-motor. Fig. 3 shows a modification wherein a continuously operating mechanism is used to provide a continuous change of relation between the controlling medium and the factor of this medium acting upon the primary or initial actuating member of the regulator.

Referring more particularly to Fig. 1, 10 designates a steam conduit, flow of steam through which is controlled by a main regulating valve 11. Spindle 12 which actuates valve 11 is connected to a piston 13 forming part of a servo-motor S. Piston 13 is acted upon, on the lower side, by the pressure of oil in space 14 and on the other side by a spring 15. Conduit 16 conducts liquid to and from the servo-motor. Flow through conduit 16 is controlled by pilot valve P which is moved to afford communication between either a supply conduit 17 and conduit 16 or a waste conduit 18 and conduit 16. Oil is supplied to conduit 17 by a pump 19 and liquid returns through conduit 18 to a reservoir 20 from which pump 19 takes its supply.

Pilot valve P is attached to a piston 21 which is acted upon, on its upper side, by pressure of liquid in space 22 and upon its lower side by a spring 23. Space 22 is connected with the liquid supply through channel 24 and is connected with a pipe 25 in which there are two oppositely disposed openings of which one, 26, is shown on the drawing. The connection between supply pipe 17 and channel 24 passes across the pilot valve as is clearly illustrated and through ports in a sleeve which surrounds the pilot valve. Channel 24 is restricted by an adjustable valve 28. Due to this restriction, change of flow through openings 26 causes a change of pressure in space 22 which serves to operate the pilot valve.

Change of flow through openings 26 is caused by rotation of an arm 29. Arm 29 has a forked lower portion which straddles pipe 25, two prongs of the fork constituting checking members for controlling outflow of liquid. This arm 29 and associated parts constitutes what is usually known as a relay, designated, generally, by reference character R. The liquid which flows out into the relay through openings 26 passes through conduit 30 back to reservoir 20. Arm 29 is pivoted on a knife-edge support 31. A pin 32 bears against the arm below support 31 and a tension spring 33 pulls on the arm at a point above support 31. Pin 32 is moved by diaphragm 34. Movement of diaphragm 34 is caused by variations of pressure in chamber 35.

The regulator thus described is substantially identical with that described in United States Patent No. 1,565,156 granted December 8, 1925 to Jenson and Persson We have shown return motion mechanism comprising an arm 36 resting against a fixed pivot 37 and against pivots 38, one on each side of spindle 12, the end of the arm being forked to encompass the spindle. A spindle 39 has a cap 40 at the top thereof and bears against arm 37, pressure being exerted by means of spring 41 which extends between the pilot valve housing and cap 40. Attached to spindle 39 is sleeve 27 which has ports in the same and is formed to so coact with a central enlarged portion of pilot valve P that, in a given position, conduit 16 is cut off from communication with the servo-motor. Changes of pressure occurring in conduit 10 are transmitted through tubing 42 to chamber 35.

The operation of the above described apparatus is as follows:

Assume that an increase of pressure in chamber 35 takes place. Arm 29 is rocked in such a manner that openings 26 are closed more or less. Liquid pressure then increases in pipe 25 and consequently in space 22. Due to increase of pressure in space 22 pilot valve P moves downwardly thereby causing conduit 16 and the servo-motor to be connected with supply conduit 17. Introduction of liquid into the servo-motor space 14 causes a rise of piston 13 against the action of spring 15 and an opening of valve 11. Opening of valve 11, flow being in the direction of the arrows, causes a decrease of pressure in conduit 10 at the point where tube 42 is connected and thus the pressure is returned to normal.

Upon upward movement of spindle 12, arm 36 is rocked to move spindle 39 and sleeve 27 downwardly thus causing the inwardly projecting parts on sleeve 27 to mesh with the ends of the extended portion of the pilot valve so that communication between conduit 17 and conduit 16 is stopped. The regulator is thus brought to a state of rest.

We have described the above apparatus in some detail in order to more fully illustrate our invention and will now more particularly point out wherein the novel features of the invention lie.

Tubing 42 is made up in part by two vessels 43, 44 which have pipes 45, 46 connected at the bottom parts thereof and which pipes are interconnected by means of a flexible tubing 47. The two end portions of tubing 42, which connect with the relay chamber and conduit 10, connect to the upper parts of vessels 43 and 44. Vessels 43, 44 and pipes 45, 46 and flexible tubing 47 contain a heavy liquid, preferably mercury. That portion of tubing 42 which connects vessel 43 with chamber 35, together with chamber 35 and the upper part of vessel 43 contain any imcompressible liquid such as water or oil. That portion of tubing 42 which connects conduit 10 with vessel 44 consists in part of a flexible tubing 48. Vessel 44 is vertically movable by means of any desired mechanism, a rack 49 and pinion 50 being shown by way of example. A handle 51 is arranged to rotate pinion 50.

The operation of this apparatus is as follows:

Assume that it is intended that the pressure in conduit 10 be 100 lbs. with the arrangements of parts as shown. The pressure in chamber 35 will not be 100 lbs. but will be so much greater than 100 lbs, as is due to the head $h$ which is the difference between the liquid levels in vessels 43 and 44. Assume this difference to be 25 lbs. A pressure of 125 lbs. then exists in chamber 35. Assume now that it is desired to operate with a pressure of 125 lbs. in conduit 10. Vessel 44 is then lowered until the liquid levels in the two vessels 43 and 44 are at the same height. There being no preponderating head of liquid (the weight of the lighter liquid in the upper part of vessel 43 and the adjacent part of tubing 42 being neglected) the pressure is then the same in conduit 10 as in chamber 35, the mercury acting simply as an impulse transmitting agency. Assume that it is desired to operate at 150 lbs. pressure. Vessel 44 is then lowered to a position below vessel 43 such that the difference in levels of mercury or other liquid represents 25 lbs. pressure. Assume that, with the arrangement set to operate at 150 lbs., an increase of pressure occurs. This increase of pressure is transmitted to vessel 44 and from vessel 44 to vessel 43 and from vessel 43 to chamber 35, the pressure having decreased in its passage through the latter portion of the liquid column until it is 25 lbs. less in chamber 35. The increment of increase will thus be transmitted to chamber 35 independently of the absolute values of pressure prevailing in conduit 10 and chamber 35. The increase of pressure acts to open valve 11 and reduce the pressure in conduit 10 in manner previously described.

As indicated the liquid column interposed in tubing 42 and the means for raising and lowering one leg thereof may be arranged at a remote distance from the relay R. Thus the relay R may be adjusted at a main control switchboard which may be some distance from the regulating valve. Obviously tubing 42 may connect to conduit 10 at a point near valve 11 and yet the adjusting apparatus may be placed at an extremely remote position.

Without the adjusting means shown and described, the same pressure would prevail at all times in chamber 35 and conduit 10. In order to adjust the regulator for different working values it would be necessary to change the reaction against the pressure in chamber 35 as by adjusting spring 33 or using other means connected with the relay housing. Such adjustment is undesirable and for extreme variations it is impossible due to the changed conditions of springs and the like.

It is often desirable to operate at different pressures for different times as for example in supplying steam to a wood pulp digestor in which the cook is begun at a low value of pressure and the finish of the cook takes place at a higher pressure. It will be obvious that we have herein provided an arrangement whereby a regulator placed at any place can be adjusted in the vicinity of the digestor for different working values without affecting parts of the regulator.

In the arrangement shown in Fig. 2 the tube 42 connects with a chamber 51 at one end of a pilot valve P which controls communication between conduit 16 and the inlet 17 or the outlet 18. Pressure in chamber 51 is opposed by a spring 23. Fig. 2 shows the invention applied to a reducing valve. An increase of pressure in chamber 51 causes a connection between conduits 16 and 18 whereby valve 11 is closed more or less. It will have been noted that the arrangement shown in Fig. 1 is what is known as an overflow governor.

In the modification shown in Fig. 2 both vessels 43 and 44 are stationary. The mercury column effecting a difference of pressure is in this case altered by means of a plunger 52 which acts in a reservoir 53 connected to tubing 42. Movement of the plunger is effected by means of a hand wheel 54. As before, tubing 42 between vessel 43 and the pilot valve contains a light liquid such as water. By turning hand wheel 54 liquid may be forced from reservoir 53 into tubing 42 and vessel 43 and force the left hand column of mercury in the loop downwardly and the right hand column upwardly.

Assume that spring 23 acting on pilot valve P is adjusted or made to resist a pressure of 100 lbs. for normal position of the pilot valve. Assume that the level of mercury in the two branches 55 and 56 is the same. This means that valve 11 will operate to maintain a pressure of 100 lbs. in conduit 10. Now assume that it is desired to operate at 90 lbs. pressure. Piston 52 is then moved to force liquid from reservoir 53 into tube 52 whereby mercury, assuming this to be the heavy liquid used, is forced downwardly in branch 55 and upwardly in branch 56. The amount of liquid forced out of reservoir 53 is sufficient to cause a difference in height of mercury column such that 100 lbs. prevail in chamber 51 while 9 lbs. prevail in conduit 10. In operation the regulation can be readily effected by watching the registration of a pressure gage connected to conduit 10.

If it is desired to have a continuous change of condition, pinion 50 or hand wheel 54 or the equivalent part may be continuously operated. This continuous operation may be obtained by causing an electric motor or other suitable automatic mechanism to continuously change the preponderating head of mercury or other liquid used. Fig. 3 shows an arrangement wherein an electric motor 57 is indicated as continuously rotating a pulley 58 which takes the place of hand wheel 54.

Instead of using a light liquid in that portion of tubing 42 which is immediately connected to the relay chamber, a gas may be used which is not condensable at the operating temperatures. However the liquid is preferred because expansion and contraction of the gas may cause a reduction of sensitivity of the apparatus. If the operating temperature surrounding this portion of the tubing is substantially constant a gas may be used to advantage in cases where it is not desired to have too sensitive a regulation.

It will be understood from the above description that the column of mercury or other liquid when arranged so as to give a preponderating head of liquid provides a pressure gradient in the tubing whereby a different average value of pressure occurs in conduit 10 and the relay chamber, while pressure variations are transmitted with a constant or like amplitude.

While we have described specific embodiments of our invention it is to be understood that it is not confined to the embodiments shown.

Having thus described our invention what we claim is:

1. In adjusting apparatus, a source of pressure impulses, a member responsive to fluid pressure, impulse transmitting tubing connected therebetween and means within said tubing comprising a fluid wholly within the tubing to cause a pressure gradient therein.

2. In adjusting apparatus for regulators, a source of pressure impulses, a member responsive to fluid pressure, impulse transmitting tubing connected therebetween having a liquid column therein for causing a pressure gradient in said tubing, said liquid column being arranged to vary the pressure gradient upon variation of height thereof and means to alter the height of the liquid column.

3. In adjusting apparatus, a source of pressure impulses, a member responsive to fluid pressure, impulse transmitting tubing connected therebetween, fluid means within said tubing to cause a pressure gradient therein and means changing the position of said fluid means to alter the pressure gradient.

4. In adjusting apparatus for regulators, a source of pressure impulses, a member responsive to fluid pressure, impulse transmitting tubing connected therebetween, said tubing being formed to produce a loop having two vertically extending legs, said loop containing mercury and means to adjust the difference in height of mercury in the legs of the loop.

5. Adjusting apparatus for regulators comprising impulse transmitting tubing including a light liquid containing portion, a vertically arranged heavy liquid containing portion and a portion containing a third fluid, a reservoir for light liquid, a connection between said reservoir and the portion of said tubing containing light liquid and means to cause flow of liquid between said reservoir and said tubing to change the head of the vertically arranged heavy liquid.

6. Regulating apparatus comprising a conduit, a main control member in said conduit, a primary regulating member for controlling said main control member, a pressure chamber adjacent said primary regulating member, impulse transmitting tubing connecting said conduit with said chamber, said tubing including a liquid column for causing a pressure gradient therein and means to alter the height of the liquid column.

7. Adjusting apparatus for regulators comprising impulse transmitting tubing, a column of mercury arranged to cause different values of pressure in different parts of said tubing while variations are transmitted in like amplitude, said column of mercury causing variation of the pressure gradient upon variation of height thereof and means to alter the effective height of the column of mercury.

8. Regulating apparatus comprising a primary regulating member, a chamber in said primary regulating member, a conduit in which pressure variations occur and tubing connecting said conduit with said chamber and containing a liquid column arranged to cause a pressure gradient in the tubing so that different values of absolute pressure may occur in said chamber and in said conduit, the arrangement being such that variations in pressure in said conduit cause variations in said chamber of like amplitude but at different average values of pressure.

9. The method of varying the normal regulating position of a main flow control member which comprises regulating said main control member in response to changes of pressure derived from changes of flow caused by change of position of said main control member and utilizing and adjusting a head of liquid to add or substract pressure to or from that pressure normally controlling the main control member.

10. Regulating apparatus comprising a source of pressure impulses subject to pressure variations, a regulating member, controlling said pressure variations, an adjusting device adapted to be positioned remotely from either said source or said regulating member and independently thereof, means to cause and to adjust a pressure gradient within said adjusting device, tubing connecting said source of impulse with said adjusting device, and tubing connecting said adjusting device with said regulating member.

11. In adjusting apparatus for regulators, a source of pressure impulses, a member responsive to fluid pressure, impulse transmitting tubing connected therebetween, said tubing being formed to produce a loop having two vertically extending legs, said loop containing mercury, and manual means for shifting the relative position of said legs to adjust the difference between the heights of mercury therein.

12. Regulating apparatus comprising a source of pressure impulses, subject to pressure variations, a regulating member controlling said pressure variations, an adjusting device adapted to be positioned remotely from said source of impulses and said regulating member and independently thereof, means to cause and to adjust a pressure gradient within said adjusting device, an extended portion of tubing connecting said source of impulse with said adjusting device, and an extended portion of tubing connecting said adjusting device and said regulating member.

In testimony whereof we hereunto affix our signatures.

FRITZ WETTSTEIN.
TAGE SCHULLSTRÖM.